J. A. Pease,
Force Pump,
Nº 11,559.  Patented Aug. 22, 1854.
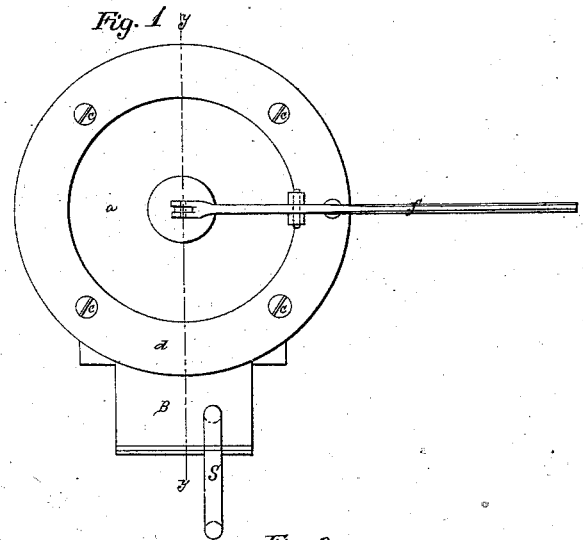
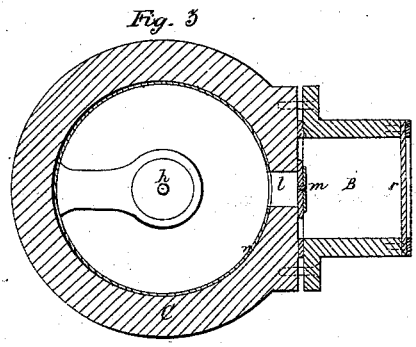
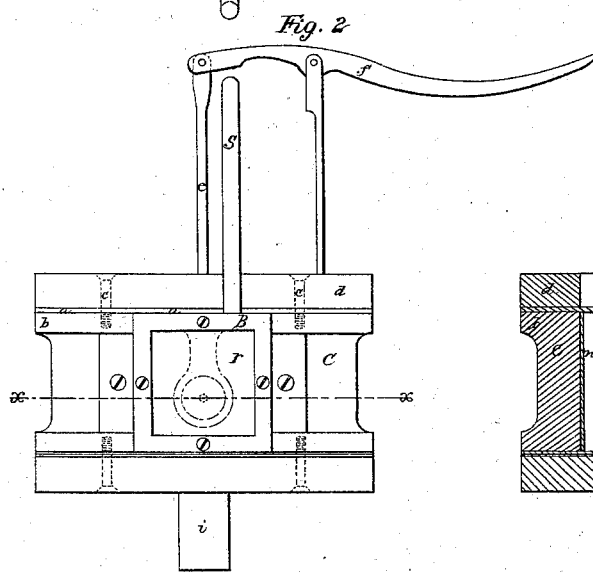
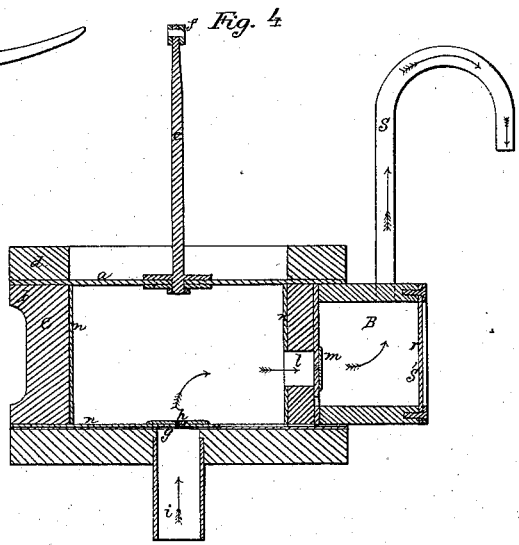

UNITED STATES PATENT OFFICE.

JULIUS A. PEASE, OF NEW YORK, N. Y.

DIAPHRAGM-PUMP.

Specification of Letters Patent No. 11,559, dated August 22, 1854.

*To all whom it may concern:*

Be it known that I, JULIUS A. PEASE, of the city, county, and State of New York, have invented a new and useful Improvement in Pumps; and I do hereby declare that the following is a full, clear, and exact description of the construction and operation of the same, reference being had to the annexed drawings, forming part of this specification, in which—

Figure 1 is a top view of the pump. Fig. 2 is a side elevation. Fig. 3 is a horizontal section on line $x$ $x$ of Fig. 2. Fig. 4 is a vertical section on line $y$ $y$ of Fig. 1.

Similar letters of reference in the several figures denote the same part of the machine.

My invention consists in employing an india rubber or other elastic covering to the cylinder for creating a vacuum by its elasticity or extension, said covering also forming the packing of the pump; also, in lining the sides and bottom of the metallic or wooden cylinder with india rubber or gutta percha, to prevent the metal or wood composing said cylinder from injuring the taste of the water by contact with the same.

To enable others skilled in the art to make and use my invention, I will proceed to describe its construction and operation. I construct my cylinder of any desired form, on the top and covering the same, I place a piece of rubber, gutta percha, or other elastic substance $a$, said substance being fastened by its outer edge to the flange $b$ of the cylinder C by bolts $c$ passing through said flange $b$, the rubber $a$, and a ring $d$. In the center of the rubber is fastened a rod $e$, which is also attached at its upper end to the lever $f$. The bottom of my cylinder has a hole $g$ in it, over which a valve $h$ plays, said hole being for the pipe $i$ that leads to the water. On one side of my cylinder is an opening $l$ for the water to pass out into the air chamber B, on the outside of said cylinder, and inside of said air chamber over the opening $l$ from the cylinder is a valve $m$. The bottom and sides of the cylinder has a lining $n$ of india rubber or gutta percha.

The operation of my pump is as follows— The downward stroke of the lever $f$ draws up and extends the rubber thereby producing a vacuum in the cylinder, causing the valve $h$ to rise and the water to enter the cylinder from the pipe $i$; the reverse stroke of the lever $f$ forces the water into the air chamber B and out the spout S. One side $r$ of the air chamber is covered with india rubber, which extends when the water is forced from the cylinder into said air chamber, and thereby keeps a constant pressure upon the water causing a continued stream to flow from the spout $s$. The cylinder may be made entirely of gutta percha or india rubber.

This construction enables me to dispense with piston, plunger, suffing box, &c., and requires moreover no boring of cylinder, turning of piston, and other expensive operations incidental to the construction of the pumps now in use. The india rubber or gutta percha lining prevents the rusting of the metal when such is used for the cylinder, and in all cases preserves the water pure and sweet whatever my be the material of which the cylinder may be formed.

What I claim as new and of my own invention and desire to secure by Letters Patent, is—

The elastic diaphragm $a$, with the metallic or wooden cylinder C, in combination with the air chamber B, for the purposes specified.

In testimony whereof, I have hereunto signed my name before two subscribing witnesses.

JULIUS A. PEASE.

Witnesses:
 GEO. PATTEN,
 ABNER CHAPMAN.